Feb. 16, 1937.   J. R. COX ET AL   2,070,649
APPARATUS FOR MOLDING PISTONS
Filed Feb. 18, 1933   4 Sheets-Sheet 1
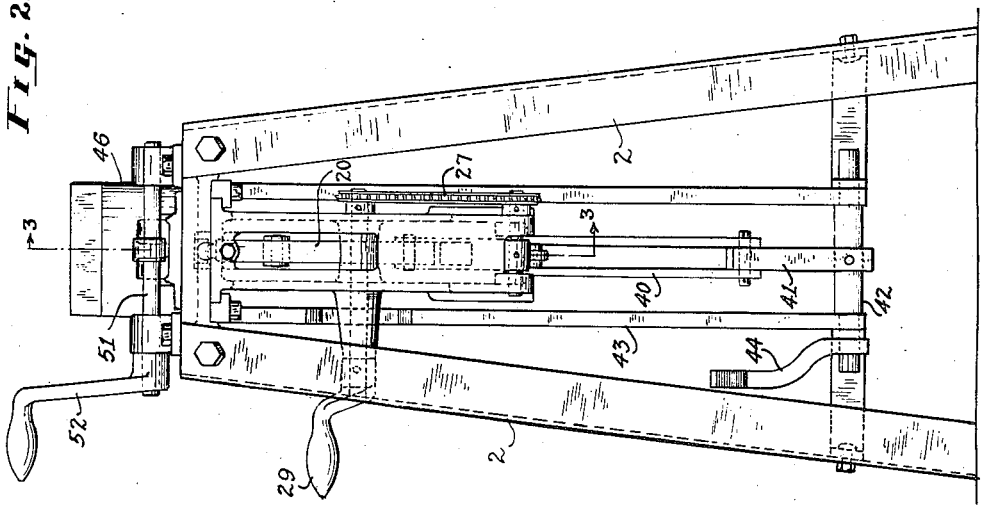
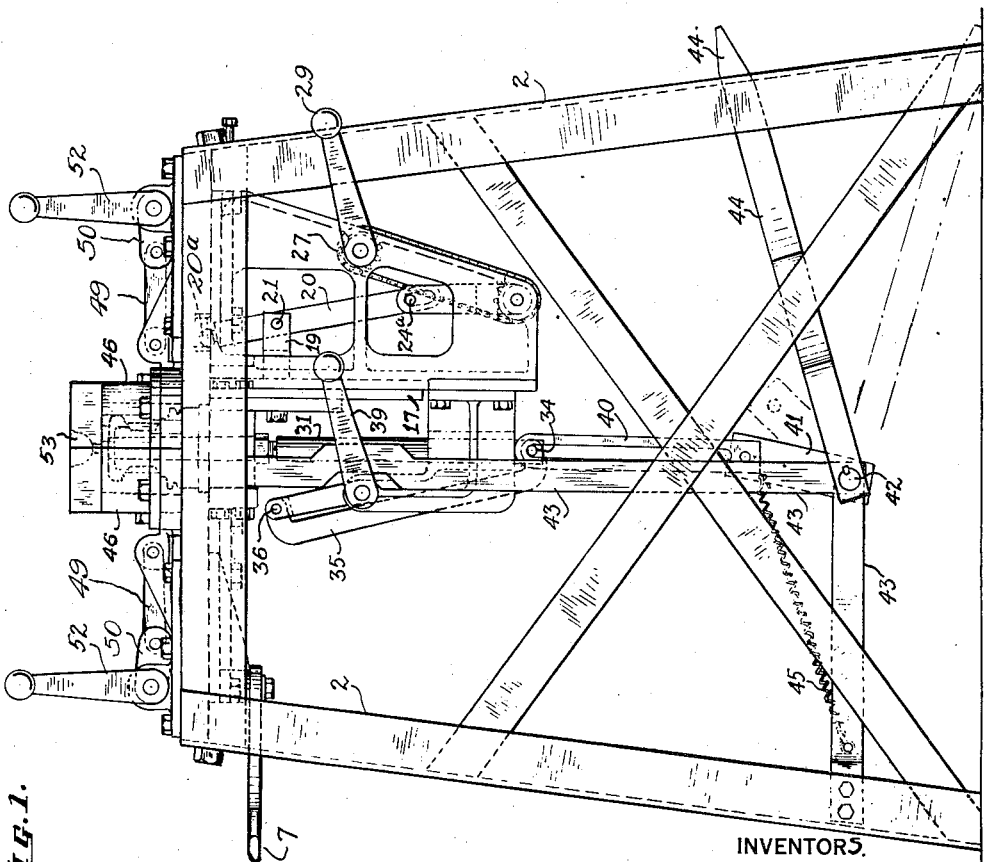
INVENTORS.
JOHN R. COX.
BY ALFRED A. ABRAMOSKA
Milburn and Milburn
ATTORNEYS.

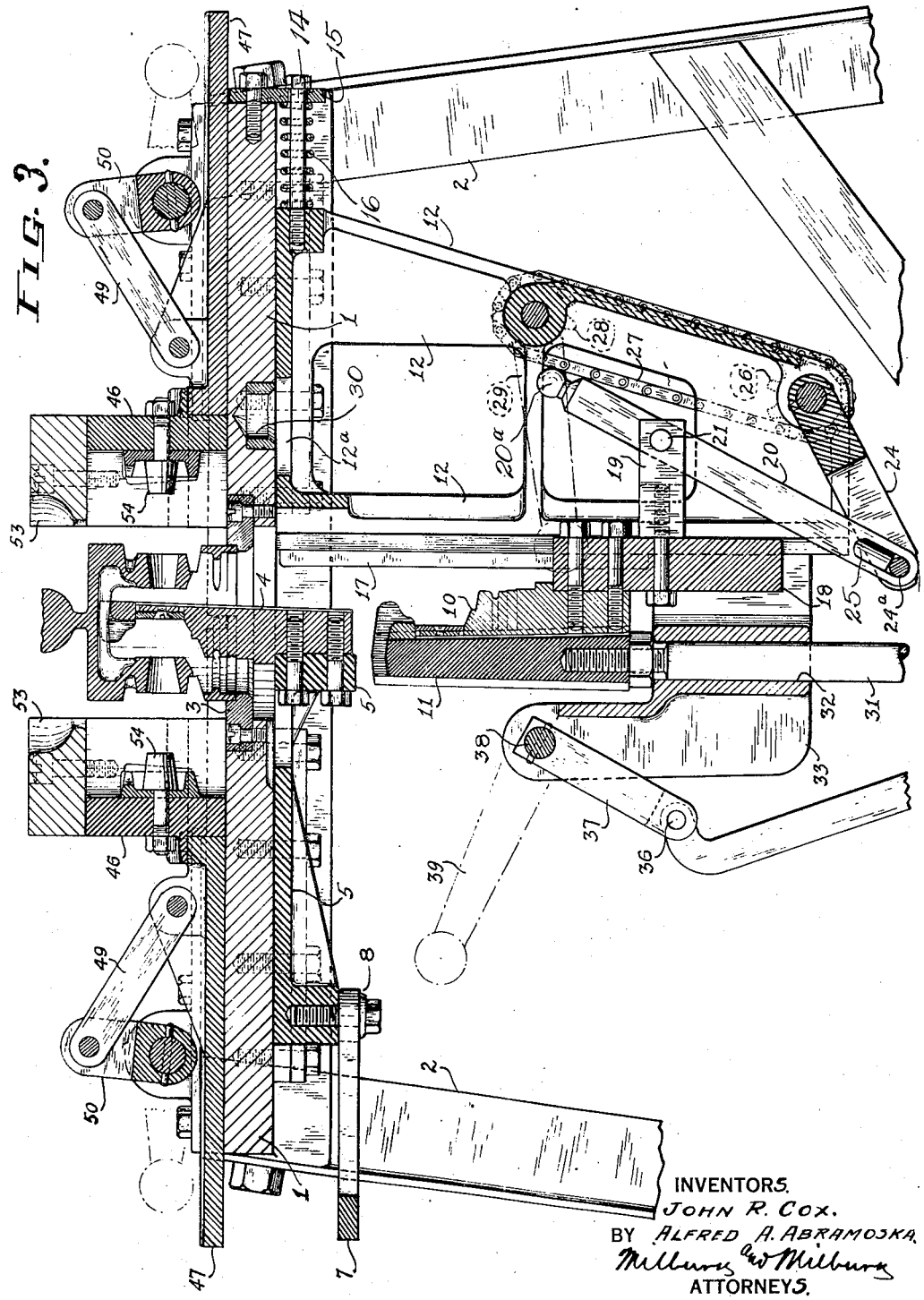

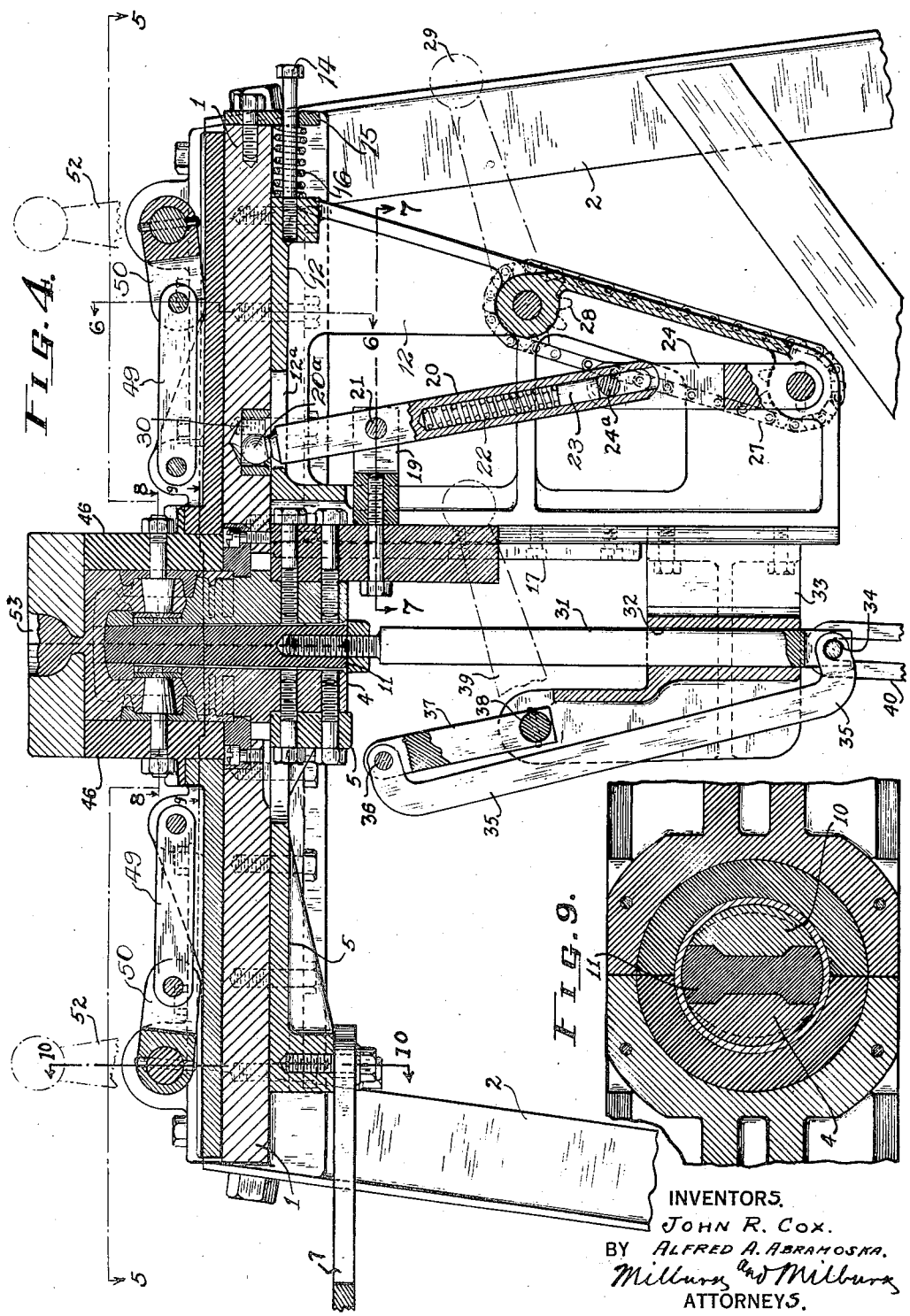

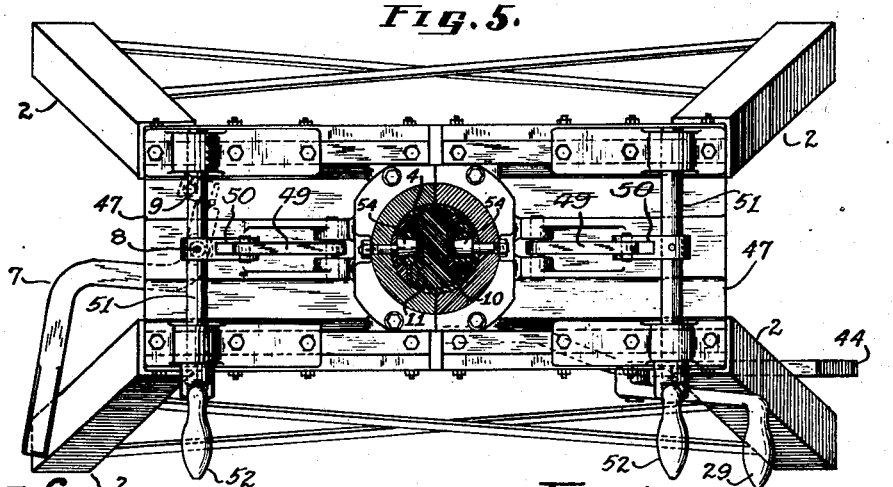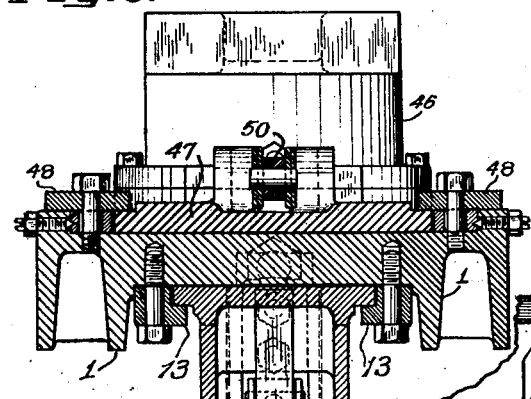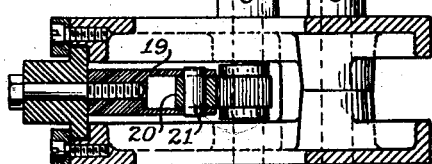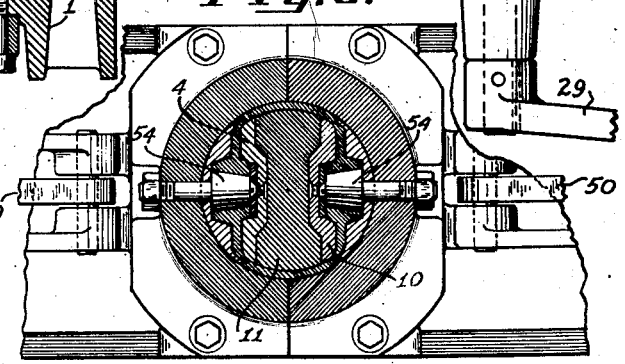

Patented Feb. 16, 1937

2,070,649

UNITED STATES PATENT OFFICE 2,070,649

APPARATUS FOR MOLDING PISTONS

John R. Cox, Lakewood, and Alfred A. Abramoska, Parma, Ohio, assignors to Thompson Products, Inc., Cleveland, Ohio Application February 18, 1933, Serial No. 657,404

6 Claims. (Cl. 22—93)

This invention relates to the art of molding castings of aluminum alloys and the like, as for instance in connection with the manufacture of composite pistons in which the skirt may be formed preliminarily of metal other than an aluminum alloy.

In a general way, the present invention pertains to that type of mechanism which comprises a sectional outer permanent mold with a gate through which the molten metal is poured and a sectional inner core which may be assembled and disassembled so as to permit the molding of the metal and the later removal of the finished casting.

One object of the present invention is to devise an apparatus of this character which is highly efficient in its operation and which is so constructed and arranged that it can be operated in a comparatively simple and convenient manner.

Another object consists in devising such an apparatus in which all of the several parts, including the mold sections, are permanently attached to the frame structure and are conveniently manipulated by the operator.

A more specific object consists in the provision of an improved mechanism for convenient and efficient manipulation of the individual members of the sectional core.

A still further object consists in the provision of convenient and effective means for maintaining the adjustable parts in set position.

Other objects will be apparent from the following description and claims when considered together with the accompanying drawings.

Fig. 1 is a front elevation of our improved form of apparatus, this view being taken from the position occupied by the operator during actual use of the apparatus;

Fig. 2 is an end elevation of the same;

Fig. 3 is a vertical longitudinal sectional view taken on line 3—3 of Fig. 2 with the sectional core and mold in inactive position;

Fig. 4 is a view corresponding to Fig. 3 except that the sectional core and mold are in active position;

Fig. 5 is for the most part a top plan view of the apparatus, this view being taken upon line 5—5 of Fig. 4;

Fig. 6 is a sectional view taken on line 6—6 of Fig. 4 and illustrates the slidable engagement of the bracket upon which the central core section and one of the side core sections are mounted for lateral movement;

Fig. 7 is a sectional view taken on line 7—7 of Fig. 4;

Fig. 8 is a transverse section taken on line 8—8 of Fig. 4 and shows in enlarged detail the sectional portion of Fig. 5;

Fig. 9 is a sectional view taken on line 9—9 of Fig. 4 and illustrates the nesting engagement of the central and side members of the sectional core; and Fig. 10 is a sectional view taken on line 10—10 of Fig. 4 and illustrates in detail the slidable engagement of the mounting for one of the side members of the sectional core and the means for operating the same.

It is to be understood, of course, that the parts of the sectional core and the sectional mold are mounted upon a suitable support and that these parts are operated by means of specially constructed and arranged lever mechanism, all of which will be hereinafter more fully described.

Briefly stated, the sectional core comprises a central core member and two side core members, and their method of operation, stated in a general way, is as follows. One side core member is first moved outwardly along a straight line to its operative position; the other side core member is then moved upwardly into the horizontal plane of the first side core member and then outwardly along a straight line to its operative position, these two movements of this second core member being performed as a continuous, single manipulation. Then, with the two side core members in active position and with proper space therebetween for the central core section, the central core member is moved upwardly along a straight line into such space between the side core members so as to thereby complete the core assembly. Then the mold sections are moved to closed position and the molten metal is then poured through the gate provided by the mold sections. When the casting has set, the core sections are withdrawn by following the reverse method of manipulation from that above described. Then the mold sections are withdrawn and the casting is removed. This same method of procedure may then be followed as often as desired.

The support for the entire mechanism comprises the table top 1 and the legs 2 therefor. The table top 1 is provided with a central opening with an annular shoulder or depression so as to provide a countersunk seat for the ring 3 which is bolted in position. It is to be understood that different rings having various sizes of openings may be employed, according to the size of casting desired. As will be seen, the ring 3 is flush with the table top 1.

One side core member 4 is removably bolted upon the inner end of the slide member 5 which has slide engagement in the slideways 6 upon the under side of the table top 1. This slide movement is for the purpose of moving the core member 4 into and out of active position and this slide movement is effected by means of the lever 7 which is pivoted at the point 8 to the underside of the slide member 5 and has a suitable form of fulcrum for the end thereof, as indicated in Fig. 5, so as to compensate for the straight line movement of the slide member 5 to which the lever 7 is pivotally connected. In the present illustration (see Fig. 5), the lever arm 7 has a reduced end portion which has free engagement within the slotted end of the member 9 which is pivotally mounted upon the underside of one of the slide bars 6, as indicated in Fig. 10. Any other suitable form of operating lever means might be adopted for this purpose, as will be readily understood.

The other side core member 10 and the central core member 11 are both carried by the same bracket 12 which is mounted in the supporting structure for horizontal sliding movement and upon which each of these two core members is adapted for individual vertical sliding movement, in the manner and for the purpose to be hereinafter more fully explained.

The bracket 12 has slidable engagement with the slide rails 13 provided upon the under side of the table 1. The bolt 14 which is secured to the one end of the slidable bracket 12, extends through a stop plate 15 depending from the table top so that the engagement of the head of the bolt 14 with the plate 15 will serve to limit the extent of slide movement of the bracket in the one direction, that is, towards the left, as viewed in Fig. 3 of the drawings. The coil spring 16 surrounds the bolt 14 and extends between the bracket 12 and the stop plate 15, so as to cushion the movement of this bracket in its extreme movement towards the right, and also to hold bracket 12 to the extreme left when core section 10 is being moved upward.

The bracket 12 is provided with vertically disposed slide rails 17 upon which is slidably mounted the support 18 for the right side core section 10, so that this core section can be moved up and down into and out of the horizontal plane of the left side core section 4.

The mechanism for manipulating the bracket 12 and the core section 10, in the manner just referred to, will now be described. From the rear side of the support 18 there extends the arm 19 to which there is pivotally connected the lever 20 at the point 21 somewhat below the upper end of the lever 20. The lever 20, throughout its lower portion, is bored out so as to form a housing for a coil spring 22 and a pin 23 which affords an abutment for the lower end of the spring which, at its upper end, seats in the upper end of the bore in the lever 20, as already referred to. The bottom end of the pin 23 is in turn engaged by the transverse pin 24ᵃ which is fixed to the one end of the link arm 24 and which extends through the slot 25 provided in the lower end portion of the lever 20. Thus, there is provided a pin-and-slot connection between these lever members so as to permit the operation intended therefor, with the further advantage of the compression spring which prevents the parts from sticking. This constitutes an automatically extensible and contractible lever mechanism, as will be readily understood.
The link arm 24 is fixedly connected at its other end to the sprocket 26 which is mounted in the bracket 12 and which is operated by the sprocket chain 27. The other sprocket 28 for the chain 27 is mounted upon the bracket 12 at a point above, and this entire mechanism is manipulated by the handle 29 which is fixed to the sprocket 28.

Thus, as will be clearly understood from the drawings (Figs. 3 and 4), rotative movement of handle 29 in the clockwise direction, as viewed in the drawings, will cause the link arm 24 also to turn in the same direction and the outer core section will be thereby moved upwardly along its slideway 17.

As above stated, the vertical movement of the outer core section 10 is independent of the central core section 11. Thus, the central section 11 remains in its lowered position, (Fig. 3), during the upward movement of the outer section 10, as just referred to.

As the outer core section 10 approaches its limit of upward movement, the upper end of the lever 20 will enter the over-size socket 30 provided in the under side of the table top 1. The engagement of the upper end of lever 20 within the socket 30, constitutes a disengageable fulcrum, as will be later more clearly understood. The top part of bracket 12 is cut out, as at 12ᵃ, to accommodate the movements of lever 20.

Thus, the engagement between these parts terminates the upward movement of the lever 20 and hence of the outer core section 10, this limit of such upward movement corresponding to the positioning of the outer core section 10 in the same horizontal plane with the first outer core section 4. The core section 10 is then ready to be moved laterally towards the right so as to occupy active position and also to thereby make room for the raising of the central core section to active position.

It will be seen that as the former manipulation of handle 29 continues in the same direction as above described, and with the upper end of lever 20 engaged within the socket 30, the lever 20 will now turn about its pivot point 21 and the upper end of lever 20 will come into engagement against the inner or left-hand side of the socket 30, as viewed in Fig. 4 of the drawings. In this way, continued operation of this mechanism will cause the lever 20 to turn in a counter-clockwise direction, the link arm 24 and the lever 20 co-acting as a toggle connection, with the automatically compensating means at the joint therebetween, as before explained. Thus, the pivot point 21 is then moved laterally towards the right, as viewed in Fig. 4, and consequently the outer core section 10 is moved outwardly along a straight line to its operative position. At the final termination of this operation, the joint between the toggle links 20 and 24 occupies position beyond dead center, as indicated in Fig. 4, and this serves as a locking means, as will be readily understood.

With the mechanism as thus far described, when operated in the manner explained, the two outer core sections are moved from inactive position, as indicated in Fig. 3, to active position, as indicated in Fig. 4. When this has been accomplished, there is left a space between the two outer core sections to accommodate the central core section which will then be moved into such space so as to occupy active position and thereby complete the assembly of the sectional core.

In passing, it should be noted that the upper end of the lever 20 is formed as a ball 20ᵃ and that the dome of the socket 30 is given a cone shape so as to facilitate the movement of the ball-shaped end of the lever 20 in the manner herein explained.

The central core section 11 is removably mounted upon the upper end of the rod 31 which is slidable up and down in the guide-way 32 provided therefor in the arm 33 of the bracket 12. The lower end of the rod 31 has pivotal connection at 34 with one end of lever link arm 35, the other or upper end of which is pivotally connected at 36 to the one end of lever 37. The lever 37 is rotatably mounted at 38 in the bracket arm 33, and has positive operative connection at this point with the crank arm 39.

The lower end of rod 31 and the pivotal connection 34 are adapted for slidable movement along the slotted link arm 40 which is pivotally connected at its other or lower end to the one end of lever 41. The lever 41 is rockably mounted at 42 in the frame 43 which forms part of the supporting structure for the operating mechanism. The foot pedal 44 is connected at 42 to the lever 41 so as to operate the same. The lever 41 and foot pedal 44, upon release thereof, are automatically returned to idle position by the spring 45 which is connected at its one end to the lever 41 and is anchored at its other end to the frame structure 43. The purpose of the foot pedal 44 will be explained below.

As soon as the bracket 12 has been moved towards the right so as to place the outer core section 10 in operative position, as above explained, then the crank arm 39 will be turned clockwise, as viewed in the figures of the drawings, with the result that the link arm 35 will be raised and the rod 31 will be raised also thereby, so as to move the central core section to active position, the lower end of the rod 31 moving along the slotted link 40 during this manipulation. Full manipulation of this mechanism, in the manner just described, will cause the upper pivot point 36 of the arm 35 to pass dead center with respect to the point 38, as is clearly indicated in Figs. 1 and 4. Thus, there is produced a locking means for holding the central core section in its raised position.

Upon completion of the molding operation, the lock thus provided will be broken by slight reverse manipulation of the crank arm 39, whereupon the central core section 11 will be freed from its operative position by depression of the foot pedal 44 which causes the upper end of the slotted arm 40 to pull down upon the pin 34 attached to the lower end of the rod 31. Such releasing of the central core section will be accomplished by the time the pedal 44 engages the floor. Then the hand crank 39 can be employed with ease for the further lowering movement of the central core section.

It will be observed that the outer bottom edge portions of all the core sections are each formed with a flange to engage under the ring 3 when in operative position. Also, the inner faces of the outer core sections are inclined inwardly and upwardly, thereby together forming a wedge-shaped space therebetween for the central core section which, as will be observed, is of a corresponding wedge shape. The core sections are adapted to fit snugly together when in assembled or operative position, as is of course necessary, and, as will be observed from Figs. 8 and 9 of the drawings, the middle areas of the inner faces of the outer core sections are formed with enlargements or ribs therealong for interlocking engagement with the corresponding reduced areas or grooves along the two sides of the center core section.

When the core sections have been moved to operative position, in the manner above explained, the two mold sections 46 will be moved to closed position preparatory to pouring the casting. These mold sections are duplicate in form and they are both provided with the same form of operating mechanism.

Each mold section is mounted upon the inner end of a slide member 47 which has slide engagement with the slide rails 48 so as to be slidable back and forth along the table top 1. This movement, in each case, is effected by means of the link 49 which is pivoted at its one end to the slide member 47 and is pivotally connected at its other end to the crank lever 50 which is fixed to the shaft 51 of the crank handle 52, the shaft 51 being rockably mounted in bearings upon the top of the slide rails 48. The link 49 and lever 50 together constitute a toggle which, when moved beyond dead center, will serve as a lock to maintain its mold section securely in closed position.

The mold sections are so formed that when in closed position, there will be afforded a bullet mold gate 53 for pouring the casting, as will be readily understood.

Each mold section is also provided with a removable core 54 which is adapted to form the bearing for the wrist pin of the piston, as will also be understood.

To recapitulate briefly, the operation of our present apparatus is as follows. Assuming that the parts are in idle position as indicated in Fig. 3, it will be observed that the left outer core section 4 is above the other two core sections, the reason for which will be later understood.

In assembling the parts preparatory to the molding operation, the left outer core section 4 is moved to the left by manipulation of the lever 7 so as to engage the ring 3. Then by continuous manipulation of the handle 29, the right outer core section 10 will first be raised to the same horizontal plane as the left outer core section 4, and will then be moved outwardly along a straight line so as to engage ring 3 and thus occupy operative position. During the lateral movement of the right core section 10, as just referred to, and as part of the same operation, the central core section 11 is moved laterally to the right so as to then be in vertical alignment with its operative position to which it is then ready to be raised. This is next accomplished by manipulation of the crank arm 39 which, by virtue of the toggle link connection, serves to lock the center core section in operative position. Thus, there is no danger of accidental dislodgment of the sections of the core.

The mold sections are then closed and the casting is poured. When the metal has had time to harden sufficiently for removal of the casting, the reverse manipulations are followed for withdrawing the core sections, as will be explained.

Preparatory to removing the casting, the lock which holds the center core section in operative position is broken by means of handle 39, after which depression of the foot pedal 44 to the floor will release the center core section which is then lowered further by means of the hand crank 39. Then the right core section 10 is moved to the left so as to permit the upper overhanging portion thereof to clear the casting and thus permit the core section 10 to be lowered.

By turning handle 29 counter-clockwise, the toggle between lever arms 24 and 20 is broken and the lever 20 is turned about its pivot in a clockwise direction. Such movement first causes the upper end of lever arm 20 to engage the right side of its socket, whereupon there is established a fulcrum for the lever arm 20 and the continued motion of this lever arm thus causes the point 21 to be moved to the left and the right core section 10 is likewise moved to the left. The core section 10 will be accompanied also by the center core section 11 during such lateral movement, as both of them are carried by the bracket 12.

When the pin 22 of lever 24 reaches the bottom end of the slot in the lower end of lever arm 20, then continued counter-clockwise motion of lever 24 will pull lever arm 20 downwardly and the right core section 10 will likewise be moved downwardly so as to occupy the position indicated in Fig. 3.

Then the left core section 4 is ready to be moved to the right to idle position, as the other two core sections have vacated the space to be now occupied by the section 4.

With the core sections all in idle position, the mold sections are then opened and the casting is removed.

It will be observed that when the sections of the core are being moved to idle position, the central section is first lowered so as to permit lateral movement of one of the side core sections. Then this side core section is lowered so as to permit lateral movement of the other side core section to idle position. Thus the construction and arrangement of these several core sections and the manner of operating the same, constitute a comparatively simple and compact form of mechanism which at the same time is decidedly dependable and efficient in its operation.

Furthermore, it will be observed that the one outer core section 10 is given a compound movement by being moved upwardly and outwardly into active position by a single continuous manipulation of its operating mechanism, and the same thing is true of the reverse manipulation for moving it from active to inactive position. At the same time and by means of the same manipulation, the central core section is moved to proper position preparatory to its succeeding individual final manipulation to bring it into either active or inactive position as the case may be.

By virtue of the particular construction and manner of operation of the parts as just referred to, it is only necessary for the side core section 4 to be moved along a straight line laterally into and out of active position.

It should be observed also that all of the various movable members of this entire mechanism are permanent parts of the apparatus and that none of the movable members is removed therefrom during its continued and repeated operation. Thus, there is involved only a minimum amount of labor and time in the operation of the device, and as a result there is made possible an increased quantity production and a corresponding decrease in cost of the finished product.

All of these several improvements have been obtained with the present mechanism without, however, sacrificing any requirements of a high class finished product. Also, it is to be understood that this apparatus is equally capable of being used in the production of a one-piece casting or a two-piece casting, and that it can be readily adapted for various sizes of pistons by making suitable substitution of parts as above suggested and as will be readily understood.

Furthermore, it is to be understood that with suitable modification within the skill of the trained mechanic, this same general combination of structural elements and the particular manner of operating the same, can be employed for producing various forms of castings other than pistons and that this invention is therefore not limited to the production of pistons alone.

It is to be understood that the present form of disclosure is merely for purposes of illustration and that the particular construction and arrangement of device herein shown might be modified without departing from the spirit of the invention embodied therein and that any and all such modifications or variations are intended to be comprehended by the following claims.

What we claim is:

1. In a molding machine, the combination of a support, an outer mold body and a sectional core mounted upon said support, said core comprising central and side members, one of said side core sections being mounted for straight-line lateral movement into and out of active position, and the other core sections being mounted for lateral movement together as a unit and being also mounted for individual, independent vertical movement so as to accommodate the lateral movement of the said one core section, and means for operating said core sections.

2. In a molding machine, the combination of a support, an outer mold body and a sectional core mounted upon said support, said core comprising central and side members, and means for moving the core sections into and out of active position, said means including mechanism for moving one of the side core sections laterally, and mechanism for moving the other side core section vertically and laterally and the center core section laterally and vertically towards active position and in the reverse order of directions towards inactive position, so as to accommodate the individual movements of the several core sections.

3. In a molding machine, the combination of a support, an outer mold body and a sectional core mounted upon said support, said core comprising central and side members, and means for moving the core sections into and out of active position, said means including mechanism for moving one of the side core sections laterally along a straight line and mechanism for moving the other core sections out of the horizontal plane of the said one side core section to inactive position so as to accommodate the lateral movement of the said one side section.

4. In a molding machine, the combination of a support, an outer mold body and a sectional core mounted upon said support, said core comprising central and side members, and means for moving the core sections into and out of active position, said means including mechanism for moving one of the side core sections laterally, and mechanism for moving the other side core section vertically and laterally and the center core section laterally and vertically towards active position and in the reverse order of directions towards inactive position, so as to accommodate the individual movements of the several core sections, said last-named mechanism including a toggle by which the mechanism will be locked in position corresponding to active position of the core sections.

5. In a molding machine, the combination of a support, an outer mold body and a sectional core mounted upon said support, said core comprising central and side members, one of said side core sections being mounted for straight-line lateral movement into and out of active position, and the other core sections being mounted for lateral movement together as a unit and being also mounted for individual, vertical movement so as to accommodate the lateral movement of the said one core section, and means for operating said core sections, said means including toggle mechanism adapted to lock the core sections in active position.

6. In a molding machine, the combination of a support, an outer mold body and a sectional core mounted upon said support, said core comprising central and side members, and means for moving the core sections into and out of active position, said means including toggle mechanism for locking the central core section in active position, a hand lever for manipulating the toggle mechanism so as to lock the same, said hand lever being also adapted for reverse manipulation to break the said toggle preparatory to withdrawing the central core section and for later lowering the central core section to fully idle position, and a foot pedal having operative connection for withdrawing the central core section from active position, after breaking the toggle, as an intermediate operation preceding further lowering of the central core section to fully idle position by further manipulation of the hand lever.

JOHN R. COX.
ALFRED A. ABRAMOSKA.